Sept. 1, 1959 P. G. ZOUCK ET AL 2,902,588
METHOD AND APPARATUS FOR CLADDING
Filed Dec. 2, 1957 3 Sheets-Sheet 1

INVENTORS
PETER G. ZOUCK
HUGH Y. RIENHOFF
BY
Pennie, Edmonds, Morton, Barrows & Taylor
ATTORNEYS

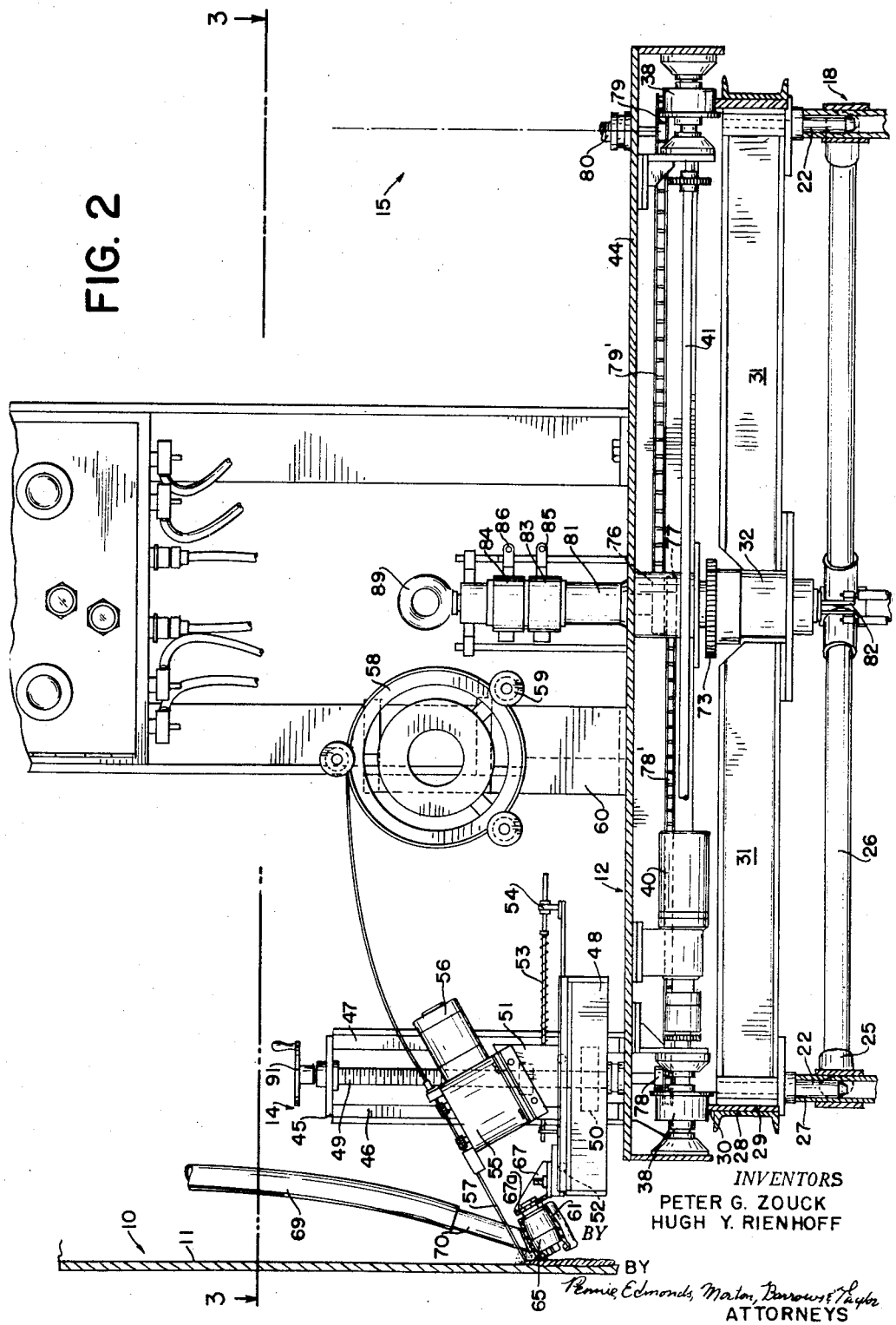

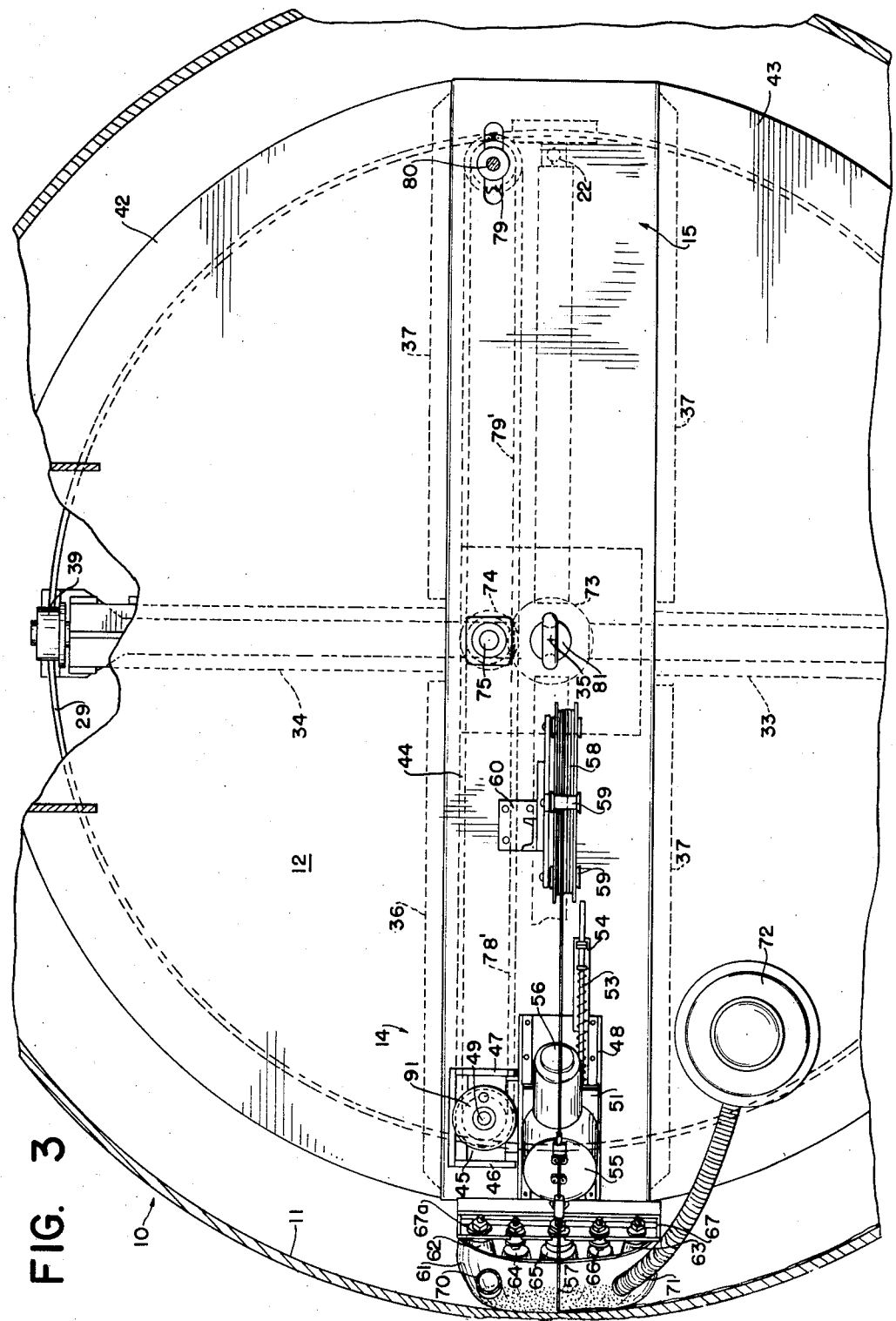

United States Patent Office 2,902,588
Patented Sept. 1, 1959

2,902,588
METHOD AND APPARATUS FOR CLADDING

Peter G. Zouck and Hugh Y. Rienhoff, Baltimore, Md., assignors to Alloy Cladding Co., Inc., Baltimore, Md., a corporation of Maryland Application December 2, 1957, Serial No. 700,196

8 Claims. (Cl. 219—76)

The present invention relates to the lining of vessels, containers, pipes or similar objects, for improvement of corrosion resistance or the like, and more particularly to a novel and improved method and apparatus for lining a large container or other stationary object by cladding the walls thereof with a material having desired properties.

In connection with paper making processes, for example, it is a conventional step in the preparation of pulp to cook the pulp in a large container, known as a digester. The cooking process takes place in a liquor which is highly corrosive in nature and tends to corrode the inner face of the digester. Accordingly, in the past, it has been necessary to periodically shut down a digester, to repair the walls thereof.

It has been found that the corrosion resistance of digesters and other containers is greatly increased by lining the interior walls thereof with a material such as a stainless steel alloy and, in digesters, etc., of modern construction, such lining is frequently incorporated in the wall structure. However, there are great numbers of such vessels in which corrosion is a substantial problem, requiring periodical, expensive maintenance.

To reduce the maintenance costs of pulp digesters, containers, pipes, etc., it has been proposed heretofore to line the inner walls with a material such as a stainless steel alloy, by cladding the alloy on the inner wall face, using welding apparatus or the like. However, as may be readily understood, pulp digesters and the like may be of a substantial size (i.e., 10 feet in diameter, and 50 feet in height), so that the cladding of the walls by depositing welding material may be a tedious and expensive undertaking. In some cases, the operation has been performed by hand welding, which involves prohibitive expense and loss of time. More recently, it has been proposed to employ semi-automatic welding apparatus, in which a plurality of welding heads move back and forth over predetermined arcs, to lay successive beads of weld material over segmented areas of the wall. The number of heads used is so related to the arc traversed by each head that the cladding is complete over the desired area of the wall. Such semi-automatic apparatus, while an improvement over the hand methods, still has many disadvantages and involves substantial expense, as compared to the method and apparatus of the invention.

In accordance with the invention, a pulp digester, container, pipe, etc., may be effectively and economically provided with a lining, of stainless steel or other desired material, by depositing one or more continuous spiral beads of weld material over the inner wall face, or over a predetermined portion thereof. Thus, one or more welding heads are arranged to travel continuously, in one direction, around the inner walls of the digester, etc., while being continuously moved axially thereof, whereby to deposit one or more beads of generally helix form along the wall. Within the physical limitations of the apparatus, the operation is continuous and substantially fully automatic, and the limits of the apparatus are such that relatively few discontinuities of operation are required in the cladding of an entire wall area.

Advantageously, the lead of the helix-like path, along which a bead is deposited, is such that there is sufficient overlapping between successive beads or convolutions to form an integral and uninterrupted layer. And, in this respect, the lead will be a function of the number of welding heads employed; that is, the lead may be twice as great, if two heads are employed, than if a single head is employed.

One of the specific features of the invention resides in the provision of a novel apparatus which permits cladding to be carried out on a continuous uninterrupted basis, within the physical limits of the apparatus. Another specific inventive feature resides in the provision of a novel cladding apparatus, including a modular supporting structure which may be quickly erected within a vessel and conveniently added to from time to time as the cladding operation progresses. Advantageously, the individual units of the modular supporting structure have an axial dimension somewhat less than the capacity of the cladding apparatus to progress axially while depositing a bead. Thus, when cladding has progressed to such a point that the welding apparatus has operated through its range of axial movement, the cladding operation is temporarily suspended and an additional unit of the supporting structure is assembled. The welding apparatus may then be reset to its starting position, enabling the cladding operation to be resumed on a continuous uninterrupted basis, through a predetermined axial range.

Other specific features of the invention reside in various structural arrangements incorporated in the new apparatus which cooperatively improve the cladding operation and the ease and efficiency with which it may be carried out. For a better understanding of these and other advantageous features of the invention, reference should be made to the following detailed description and to the accompanying drawing in which:

Fig. 2 is an enlarged, fragmentary, cross-sectional view of the new apparatus for cladding in accordance with the invention; and Fig. 3 is a fragmentary, cross-sectional view taken generally along line 3—3 of Fig. 2.

Figure 1:
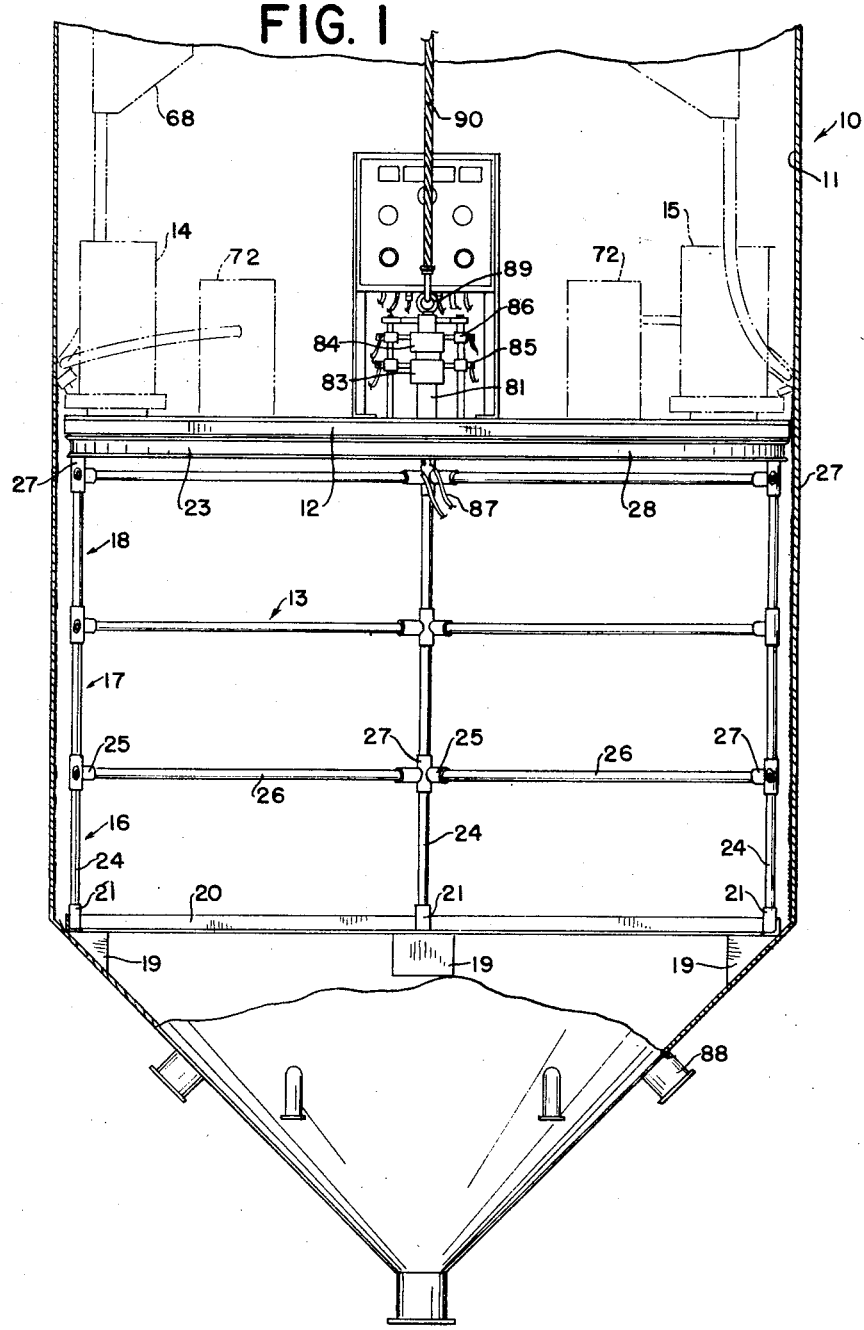
Fig. 1 is a fragmentary, longitudinal, cross-sectional view of a container, such as a pulp digester, for example, having assembled therein apparatus for cladding in accordance with the invention.

Referring now to the drawings, and initially to Fig. 1, by reference numeral 10 designates generally, and by way of example, a pulp digester. The digester, which is of conventional form, is a large cylindical container having a wall 11 which is cylindrical throughout most of its axial (usually vertical) extent.

In order to clad the wall 11, in accordance with the invention, a bead of suitable material, such as a stainless steel alloy, is deposited around the inner surface of the wall in generally spiral fashion, with the lead or axial displacement of the spiral or helix being such that each convolution overlaps the next preceding convolution by an amount appropriate to achieve continuity of the surface lining. Accordingly, the lead will be determined by the number of beads deposited and by the width of each bead.

As will be described in greater detail, the apparatus comprises a platform, generally designated by the numeral 12, which is rotatably supported upon a supporting structure generally designated by the numeral 13. The platform 12, of the illustrated apparatus, supports a pair of welding stations 14, 15 positioned in diametrically opposed relation on the platform, and located closely adjacent the cylindrical wall 11. By means to be described, the platform 12 is adapted to be rotated continuously in one direction, to move the welding stations 14, 15 repeatedly around the inside of the vessel wall 11. By other means to be described, welding heads of the welding stations 14, 15 are operatively connected for axial movement relative to the platform 12, in direct relation to rotation of the platform relative to its supporting structure. The arrangement is such that during each complete revolution of the platform 12 the welding heads are automatically raised, progressively or otherwise, a predetermined amount calculated to provide partial overlapping of the spiral convolutions of cladding material.

As will be observed in Fig. 1, the supporting structure 13 comprises a plurality of modular units 16—18 which, as will be described in more detail, are independent structural units adapted quickly to be superimposed one upon the other to provide an overall supporting structure of predetermined height. Thus, in a cladding operation, when sufficient revolutions of the platform 12 have occurred to raise the welding heads to upper limit positions, the operation is temporarily suspended while an additional modular unit is added to the supporting structure 13. The operations may then proceed, starting from a higher level in the digester or other object.

In the illustrated form of the invention the supporting structure 13 is comprised of a plurality of lightweight structural elements, such as structural tubes, which are connected together in generally rectangular form and supported near the base of the vessel 10. Thus, as shown in Fig. 1, the vessel may be provided near its bottom with a plurality of base blocks 19, which may be welded or otherwise secured to the vessel wall, as temporary supports to be removed at the end of the lining operation. Supported on the base blocks 19 is a rectangular frame 20, comprising a plurality of angle irons, for example, at each corner of which is provided an upstanding tubular socket 21. As will be more fully described, the sockets 21 are so arranged as to receive pins 22 (bottom, Fig. 2) projecting downwardly from a platform support 23. However, in the illustration of Fig. 1, the sockets 21 receive vertical columns 24 of tubular structural material or the like. At the upper ends of the columns 24 are provided connectors 25, for receiving horizontal bracing elements 26, extending between the columns 24 and forming a rectangle spaced directly above the rectangular frame 20. The connectors 25 are provided with upwardly opening sockets 27 similar to the sockets 21. Accordingly, when the columns 24, connectors 25 and bracers 26 are assembled and secured in place, there is provided a structure similar to the base structure but raised a predetermined distance above the base.

As will be apparent, the structural elements 24—26 form a modular structural unit, with which a supporting structure 13 of any desired size may be provided by the simple expedient of superimposing additional modular units, such as indicated at 17, 18. The uppermost unit has tubular sockets 27 which receive the pins 22 of the platform support 23, forming the top of the supporting structure.

Referring now to Figs. 2 and 3, the platform support 23 comprises a circular channel 28 having an outer diameter somewhat less than the internal dimensions of the object to be clad and an inner diameter which may be slightly greater than the diagonal, corner-to-corner dimension of the structural units 16—18. Welded or otherwise secured to the inner surface of the channel 28 is a circular track 29 having a portion 30 which projects above the channel. The channel 28 and track 29 are braced by four structural members 31, such as I-beams, which are related at right angles to each other and extend radially outward from a central housing 32. The channel member 28, circular track 29, structural members 31 and housing 32 are welded or otherwise suitably fastened together to form a rigid structural unit.

At or adjacent the outer ends of the structural members 31 are secured the pins 22, which project downwardly below the structural members 31 and have portions adapted to be received in the sockets 27 of the uppermost structural unit 18. The arrangement is such that the platform support 23 forms, in effect, an active part of the supporting structure 13.

The platform 12 of the apparatus comprises a structural frame, including beams 33, 34 extending radially outward in opposite directions from a central axis 35, and spaced pairs of channel members or like structural elements 36, 37 disposed at right angles to the beams 33, 34 and extending parallel to an axis intersecting the central axis 35. Adjacent the outer ends of the structural members 33—37 there are mounted flanged wheels 38, 39 which are adapted to be supported by the circular track 29. At least one of the wheels, and advantageously both of two diametrically opposed wheels 38, is adapted to be power driven, as by means of an electrical motor 40 and connecting drive shaft 41. The arrangement is such that, when the motor 40 is energized, the structural elements 33—37, comprising the frame of the platform 12, will be caused to rotate at a predetermined speed on the platform support 23.

A working surface for the platform 12 may be provided by a pair of generally semi-circular floor plates 42, 43 supported on the structural elements 33—37. As will be observed in Fig. 3, the floor plates 42, 43 in conjunction with a central floor strip 44, provide a generally circular working surface or floor, the diameter of which is somewhat less than the internal diameter of the vessel wall 11, so that the platform may freely rotate within the vessel.

At diametrically opposed points on the platform 12 are mounted welding stations 14, 15. Both welding stations may be substantially identical in form and therefore only the station 14 is illustrated in detail in Figs. 2 and 3. The illustrated welding station 14 comprises a vertical guide member 45 fixed to the platform 13 and having a pair of spaced rails or tracks 46, 47. An elevating block 48 is guided by the rails 46, 47 for movement with respect to the platform and is supported by means of a rotatable threaded shaft 49 engaging a suitable threaded nut or collar 50. Accordingly, the position of the elevating block 48 with respect to the platform 12 may be varied by rotation of the threaded shaft 49.

Mounted on the elevating block 48 is a carriage 51 having suitable wheels 52 or other means providing for movement of the carriage in a radial direction with respect to the block 48. In accordance with one aspect of the invention, the carriage is normally urged to move radially outward, by means of a spring 53 acting against a bracket 54 secured to the elevating block.

In the illustrated apparatus, the carriage 51 mounts a conventional submerged arc welding head, comprising electric power means 55 and a drive motor 56 adapted to feed a welding electrode 57 toward the vessel wall 11 and to supply electrical current to the electrode. The arrangement is such that, when the welding apparatus is in operation, the vessel wall 11 and the welding electrode 57 act as opposite terminals of an electrical circuit, so that an arc may be formed at the end of the electrode.

The welding apparatus, which may be of conventional design, includes means to supply welding electrode continuously, within limits. Thus, as shown in Fig. 3, a large reel or spool 58 of electrode wire is supported, as by a plurality of rollers 59, on a post 60 secured to and extending upwardly from the guide member 45. In accordance with known welding techniques, as electrode is consumed, the characteristics of the arc are altered and, by means of suitable automatic circuitry, the motor 56 is automatically energized to feed new electrode at an appropriate rate.

In a submerged arc welding process, the arc between the electrode and the ground member (in the present case the wall 11) is submerged in a body of granulated flux. Accordingly, it is necessary to provide means positioned below the electrode to support the flux. To this end, the apparatus of the invention incorporates a flexible endless belt 61 which is trained about a pair of end rollers 62, 63 (Fig. 3) and a plurality of intermediate rollers 64—66. The rollers 62—66 are mounted on a bracket 67 fixed to the radially movable carriage 51 and, as shown in Fig. 2, the bracket is so arranged that the rollers 62—66 are disposed along axes extending downwardly and outwardly toward the vessel wall.

Advantageously, the endless belt 61, which is formed of a flexible material such as rubber, is of greater width than the rollers 62—66 and is so arranged that the outer edge of the belt projects beyond the outer ends of the rollers. The arrangement is such that, when the assembly of the belt 61 and rollers 62—66 is urged radially against the wall 11, the outer edge of the belt, along the upper reach thereof, is deformed to an extent such that the upper reach of the belt is in tight contact with the wall over a substantial length.

As shown in Fig. 2, the portion of the belt 61 which contacts the wall forms a V-shaped groove or pocket for retaining a supply of granular welding flux. Advantageously, the groove extends circumferentially of the wall, on both sides of the electrode 57, so that as the electrode is carried around the wall flux may be deposited in front of the electrode and removed behind the electrode. In this respect, it is important that the flux be held steady during the instants of welding, so that the "puddle" of molten metal is not disturbed or otherwise affected by shifting of the flux. Accordingly, the belt 61 is advantageously pressed against the wall with sufficient force to provide a substantial frictional grip between the wall and the belt. Then, as the welding station is moved circumferentially with respect to the wall the upper reach of the belt will remain motionless relative to the wall for a certain distance in front of and behind the electrode. With this arrangement, no external driving means is required for the belt.

For depositing and picking up the welding flux, it may be advantageous to provide a suitable hopper 68 (Fig. 1) which holds a supply of flux and feeds it through a conduit 69 to a discharge nozzle 70 positioned above the belt 61 and in front of the electrode 57 in the direction of its circumferential movement. A predetermined distance behind the electrode there is a second conduit 71 leading to a vacuum device by means of which loose granules of flux are picked up and collected for reuse. Some of the flux, of course, is consumed, by combining with the molten metal or otherwise.

It is contemplated that the apparatus of the invention may be utilized in connection with the lining of containers, pipes, etc., of various sizes. Accordingly, as one specific aspect of the invention, means are provided for adjusting the contours of the belt 61, so that the upper reach of the belt may conform as closely as possible to the contours of the wall to be clad. To this end, some or all of the rollers 62—66 are adjustable upwardly and downwardly along the angular mounting plate 67a of the bracket 67. Thus, as shown best in Fig. 3, the upper reach of the belt 61 may be rendered arcuate in form by moving the rollers 64—66 upwardly with respect to the end rollers 62, 63. The axes of the rollers 62—66 are so disposed with respect to the wall 11 that the edge of the belt 61 which is presented to the wall is of curved shape and, if properly adjusted, will conform closely to the curvature of the wall. Such departures from the wall curvature as are unavoidable in effecting the initial adjustment of the belt are accommodated by the flexible projecting edge portion of the belt.

In accordance with the invention, a lining material is clad upon the inner surface of the wall 11 by actuating the welding stations 14, 15 and rotating the platform 12 to carry the welding stations continuously around the wall. As the welding stations progress around the wall the welding heads are advantageously raised or elevated in proportion to circumferential travel, so that each bead of the lining material is deposited in the form of a helix. To this end, the platform support 23 includes a gear 73, which is fixed to the housing 32 and meshes with a gear 74, the latter being fixed to a shaft 75 journaled in the rotating platform. As the platform rotates, the gear 74 and shaft 75 are caused to rotate relative to the platform in a desired manner. Rotations of the shaft 75 are utilized to elevate the welding heads by means of drive connections including sprockets 76, 77 on the shaft 75, sprockets 78, 79 fixed to threaded shafts 49, 80 of the welding stations 14, 15 respectively, and chains 78', 79'. Thus, as the platform rotates, the threaded shafts 49, 80 are rotated in exact accordance therewith to progressively elevate the welding heads the desired amount. Advantageously, the relationship of the gears 73, 74, sprockets 76—79 and threaded shafts 49, 80 is such that during each complete revolution of the platform 12 the welding heads are elevated in amounts somewhat less than twice the thickness of each deposited bead. The arrangement is such that the bead deposited by the welding station 14, for example, will slightly overlap the bead deposited by the welding station 15.

In carrying out cladding operations on various objects, the optimum lead, or axial advance of the welding heads, may vary from one job to another, depending upon such factors as the nature of the cladding material, the number of welding stations, etc. Accordingly, provision may be made for changing the sprockets 76—79, for example, to achieve different drive ratios. Alternatively, suitable variable transmission means may be incorporated in the drive means for the shafts 49, 80.

In appropriate cases, the elevating mechanism may be arranged to raise the welding heads in a more or less step-by-step fashion, one or more times during each revolution, and it will be understood that such alternative arrangements are contemplated within the scope of the invention.

In the illustrated apparatus, the welding heads are operated by electrical energy, which is supplied from source external of the digester 10. Accordingly, as one of the specific features of the invention, novel arrangements are provided for continuously supplying electrical energy to the welding heads during the continuous rotation of the platform 12. Thus, referring to Fig. 2, the housing 32 of the platform support 23, has an extension 81 which projects upwardly, through the floor strip 44 of the platform. The extension 81, as well as the housing 32, is of tubular construction and houses internally suitable cables or other conductor means (not specifically identified) leading to terminals 82 exposed below the platform support 23. The exposed upper end of the extension 81 is provided with a plurality of slip rings 83, 84 which are electrically connected to the terminals 82 and which cooperate with suitable brushes 85, 86 carried by the platform 12. The terminals 82 are connected to a power source by suitable conductor means (Fig. 1) which may extend downwardly in the vessel and through an outlet opening 88, for example, for connection to a convenient power outlet. During rotations of the platform 12, the brushes 85, 86 slide along the slip rings 83, 84 and maintain a constant connection to the power source. It is understood, of course, that the welding stations 14, 15 are connected in circuit with the brushes 85, 86 in a suitable manner.

In the operation of cladding a digester or other large, stationary object, the base 20 is assembled in the interior of the object and the platform 12 and platform support 23 are lowered into engagement with the base 20 by insertion of the pins 22 in the tubular sockets 21. Lowering of the platform 12 and its support 23 may be conveniently accomplished by engaging a hook eye 89, at the upper end of the tubular extension 81, by means of an appropriate crane or hoist.

A cladding operation is initiated by energizing the platform drive motor 40 and the welding stations 14, 15. The platform 12 is thereby caused to rotate at a preset uniform speed, and the welding heads cause beads of cladding material to be deposited at diametrically opposed points on the wall. Initially, the elevating blocks 48 of the welding stations are set in their lowermost positions. However, as the platform rotates, the elevator blocks are raised progressively (or in step-by-step fashion) by means of the threaded shafts 49, 80; and, in this respect, it will be noted that rotation of the shafts 49, 80 is dependent solely upon rotation of the platform 12 and not upon operation of the platform drive motor 40. Thus, any slippage which may occur between the driven wheels 38 and the circular track 29 will not cause the form of the deposited beads to be other than the desired helical form.

During rotation of the platform 12, as the cladding operation proceeds, the welding stations may traverse portions of irregular contour along the wall. Such irregularities, if of a minimum nature, are readily accommodated by the deformed flexible edge of the belt 61, while irregularities of a greater magnitude are compensated for by the spring 53, which continuously urges the welding carriage 51 radially outward against the wall.

After the cladding operation has continued to such an extent that the elevating blocks 48 of the welding stations are at or near the upper limit positions of their vertical traverse, the operation is temporarily discontinued, so that the platform 12 and its support 23 may be moved to a new level. To this end, the platform support may be engaged by the hook eye 89 and raised by a hoist line 90, for example. This permits a structural unit, such as indicated at 16, 17 or 18, to be assembled beneath the support 23.

Assembly of a unit of supporting structure below the platform 23 may be carried out by removing the floor plates 42, 43 from the platform 12 to expose areas below the platform. This enables workmen to have access to the area below the platform for assembling the various elements of a structural unit.

The assembly of a new unit of supporting structure may be completed in a short time, following which the hoist line 90 is lowered, until the pins 22 are received in tubular sockets 27 of the structural connectors 25.

When the platform is supported at a new level, the welding heads are lowered to the point where the cladding was discontinued, and this is accomplished by means such as hand wheels 91 (Fig. 2) which are fixed to the rotatable shafts 49, 80 and facilitate manual rotation of the shafts in a direction to lower the elevating blocks 48. Suitable arrangements, not specifically shown, are provided for disconnecting the threaded shafts 49, 80 from the drive system during manual lowering of the welding heads. When the welding heads are thus lowered, the shafts 49, 80 are reconnected to the driver system and the apparatus is ready for a subsequent cycle of cladding.

The foregoing series of operations may be repeated as often as necessary to clad the entire wall, with additional structural units of the supporting framework being added periodically as necessary. In this respect, it will be understood that the height of each structural unit is somewhat less, or at least no greater than the vertical traverse of the welding heads, so that, following each addition to the supporting structure, cladding may be initiated where it was discontinued, with no interruptions in the lining.

The new method and apparatus have substantial advantages, in that substantially fully automatic and continuous cladding of large, stationary objects is made possible. This permits of great savings in the cladding operation and also minimizes the down time of an object such as a digester.

One of the important features of the invention resides in the cladding of a stationary wall by depositing one or more helical beads of lining material along the wall in a continuous and uninterrupted manner, within physical limits of a particular apparatus. By this method, substantial time savings are realized, in that non-productive movements and/or operations of the equipment are reduced to a practical minimum, and an improved lining is achieved as a result of more uniform application of the welded beads and fewer end-to-end discontinuities.

The new apparatus may be used to great advantage in carrying out the improved method, in that an object of large dimensions may be clad with relatively simple and substantially portable equipment, including a modular supporting structure which may be incrementally erected as the cladding operation progresses. The foregoing and other features of the apparatus provide for maximum versatility, so that the apparatus may be readily transported from place to place and adapted to objects of various size.

It should be understood, however, that the specific forms of the invention herein illustrated and described are intended to be representative only, as certain changes may be made therein without departing from the clear teachings of the disclosure. Accordingly, reference should be made to the following appended claims in determining the full scope of the invention.

We claim:

1. The method of lining an inclined or vertical wall of a stationary body of revolution, which comprises moving one or more welding heads unidirectionally around the wall and advancing the head or heads axially in accordance with such unidirectional movement whereby to deposit one or more continuous beads of lining metal in spiral-like manner along the wall, said lining being accomplished wholly from within the body of revolution, the spiral-like path of any bead having a lead angle such that during each complete traverse around the wall the bead advances a predetermined axial distance, the predetermined distance being such that an uninterrupted surface lining is formed by repeated traverses of the welding head or heads.

2. The method of claim 1, in which there are a plurality of beads, and the lead of each bead is in multiple relation to the pitch between successive convolutions of bead, the multiple being in accordance with the number of beads.

3. Apparatus for lining the wall of a stationary object, which comprises a support adapted to be positioned adjacent the wall of the object, a platform mounted on said support for rotation, means for rotating said platform continuously in a predetermined direction, means on the platform for depositing a bead of lining metal on the wall as the platform rotates, and means for advancing the depositing means axially in accordance with rotation of said platform.

4. The apparatus of claim 3, in which the depositing means is a welding head adapted to deposit a bead of weld metal of predetermined width, and the advancing means advances said welding head a predetermined distance in relation to the width of the bead.

5. The apparatus of claim 4, in which there are a plurality of welding heads spaced angularly on said platform and each head is adapted to deposit a bead of predetermined width, and the advancing means advances the heads in predetermined multiple relation to the width of the beads.

6. The apparatus of claim 3, for use in lining an object which is a body of revolution, in which the depositing means is mounted on the platform for radial movement with respect to the walls of the object, and means are provided for urging the depositing means radially outward toward the wall.

7. The apparatus of claim 3, in which the advancing means comprises drive means interconnecting said support and the depositing means, whereby rotational movement of the depositing means relative to the support actuates said drive means.

8. The apparatus of claim 3, in which the advancing means operates to advance the depositing means through a predetermined limited range, and said support is a modular structure comprising one or more structural units having axial dimensions not greater than said limited range.

References Cited in the file of this patent

UNITED STATES PATENTS

| | | |
|---|---|---|
| 2,187,786 | Jacobus | Jan. 23, 1940 |
| 2,299,747 | Harter | Oct. 27, 1942 |
| 2,529,812 | Peters | Nov. 14, 1950 |
| 2,638,524 | Meyer | May 12, 1953 |
| 2,698,891 | Meyer | Jan. 4, 1955 |

FOREIGN PATENTS

| | | |
|---|---|---|
| 743,555 | Great Britain | Jan. 18, 1956 |